United States Patent

Fuchs

[11] Patent Number: 6,116,731
[45] Date of Patent: Sep. 12, 2000

[54] SUNGLASSES WITH PLUG-IN CONNECTION FOR AN OPTICAL SPECTACLE

[75] Inventor: Gerhard Fuchs, Pasching, Austria

[73] Assignee: Silhouette International Schmied GmbH & Co. KG, Linz, Austria

[21] Appl. No.: 09/355,015

[22] PCT Filed: Dec. 11, 1997

[86] PCT No.: PCT/AT97/00273

§ 371 Date: Jul. 21, 1999

§ 102(e) Date: Jul. 21, 1999

[87] PCT Pub. No.: WO98/34150

PCT Pub. Date: Aug. 6, 1998

[30] Foreign Application Priority Data

Jan. 31, 1997 [AT] Austria ........................................ 152/97

[51] Int. Cl.⁷ ........................................................ G02C 9/00
[52] U.S. Cl. ................................................ 351/47; 351/57
[58] Field of Search ........................ 351/47, 57, 48, 351/58, 40, 41

[56] References Cited

U.S. PATENT DOCUMENTS

| | | |
|---|---|---|
| 5,170,502 | 12/1992 | Hegendoerfer et al. . |
| 5,410,763 | 5/1995 | Bolle . |
| 5,412,438 | 5/1995 | Bolle' . |
| 5,428,407 | 6/1995 | Sheffield . |
| 5,841,506 | 11/1998 | Karasawa et al. .......................... 351/47 |
| 5,929,963 | 7/1999 | McNeal ...................................... 351/47 |

FOREIGN PATENT DOCUMENTS

| | | |
|---|---|---|
| 2 620 023 | 3/1989 | France . |
| 2 681 442 | 3/1993 | France . |
| 34 13 872 | 10/1984 | Germany . |
| WO91/11159 | 8/1991 | WIPO . |

Primary Examiner—Hung Xuan Dang
Attorney, Agent, or Firm—Collard & Roe, P.C.

[57] ABSTRACT

There are described sunglasses with an optical spectacle insert (14) which consists of a frame (16) for two spectacle glasses (15) and in the vicinity of its nose piece (17) can releasably be connected with the sunglasses. To create advantageous constructional conditions, it is proposed that in its nose piece (17) the optical spectacle insert (14) should have a through hole (18) for at least one plug-in projection (10) of an attachment plug engaging in a plug-in recess (11) of the forehead-side portion (5) of the sunglass frame (1).

6 Claims, 2 Drawing Sheets

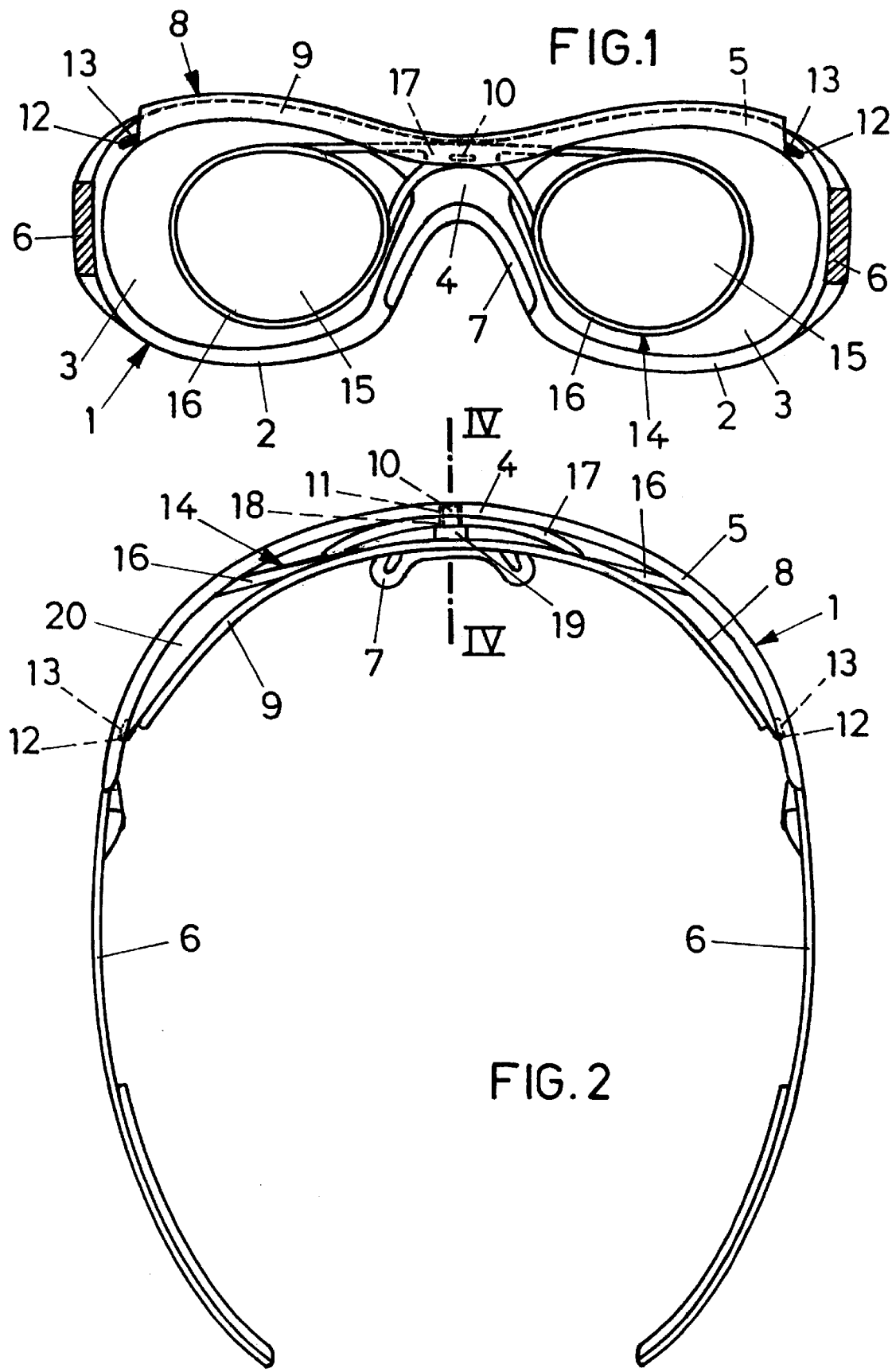

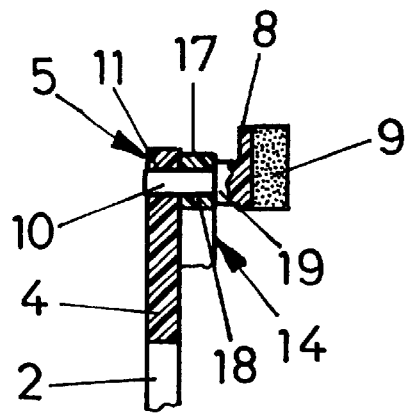
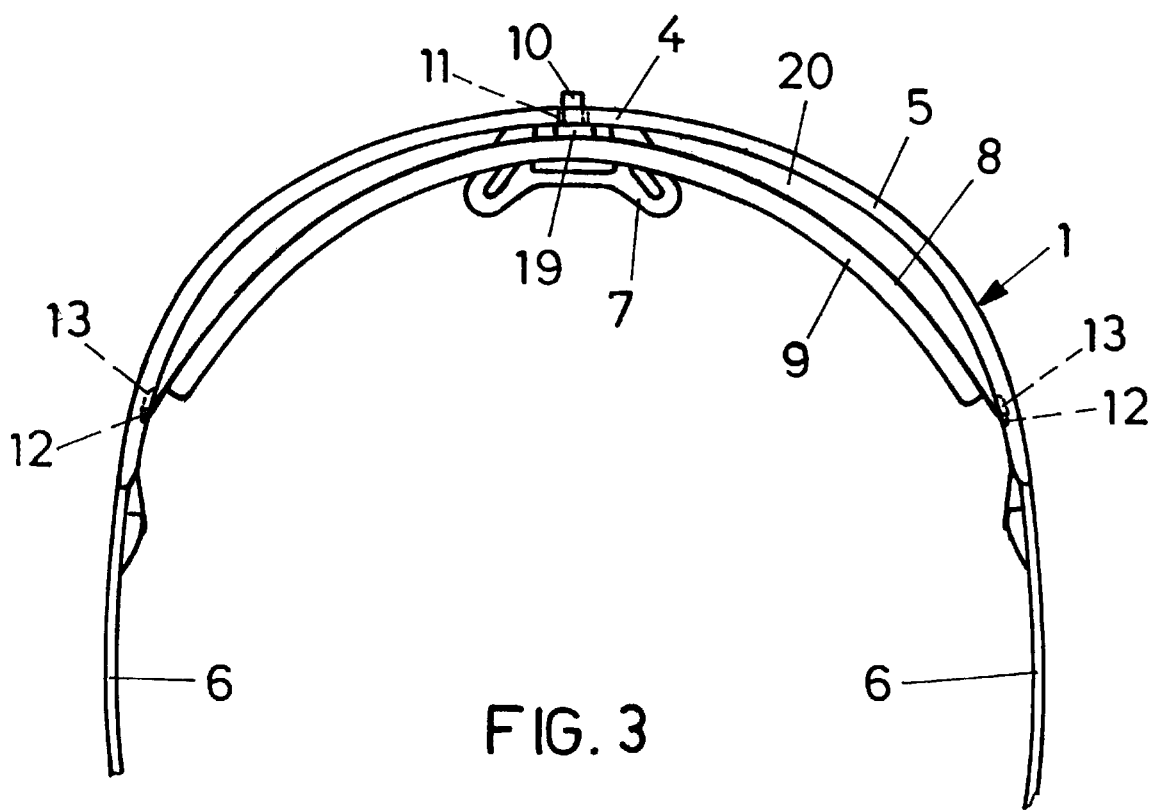

SUNGLASSES WITH PLUG-IN CONNECTION FOR AN OPTICAL SPECTACLE

This invention relates to sunglasses with an optical spectacle insert which consists of a frame for two spectacle lenses and in the vicinity of its nose piece can releasably be connected with the sunglasses.

In known sunglasses of this kind (U.S. Pat. No. 5,412,438) there is provided an integral sun protection disk which is inserted in a frame consisting of a forehead-side bridge at which spectacle bows are pivotally mounted and which on its inside carries a replaceable headband put onto the same, which rests against the forehead of the spectacle user. In the vicinity of the nose, the sun protection disk is provided with a recess which replaceably accommodates a nose pad. To be able to use an optical spectacle insert, there is provided a nose pad with a mounting lug protruding upwards on the inside of the sun protection disk, onto which mounting lug the optical spectacle insert can be put with a nose strap bent out against the sun protection disk in a U-shaped manner. It is disadvantageous in this known attachment of the optical spectacle insert at the sunglasses that an integral sun protection disk with a replaceable nose pad is absolutely necessary.

For fixing an optical spectacle insert between a nose piece and a forehead-side portion of a sunglass frame, it is also known to fix a coupling piece in the manner of a snap lock between the nose piece and the forehead-side portion of the sunglass frame, which coupling piece is provided for selectively accommodating either the optical spectacle insert provided with a nose pad or merely a nose pad.

For connecting the optical spectacle insert or the nose pad with the coupling piece, the coupling piece can either be provided with a vertical plug-in hole for a plug-in projection provided at the nose pad or at the frame of the optical spectacle insert (U.S. Pat. No. 5,170,502), or with locking recesses into which two parallel bow webs engage in the manner of a snap lock, which bow webs are formed either by the frame of the optical spectacle insert or by a bow top of the nose pad (DE 34 13 872 C2). Apart from the comparatively large construction effort, a disadvantage of this prior art is the respectively necessary adaptation of the frame of the optical spectacle insert to the respective recess of the coupling piece. Comparable disadvantages are also obtained in another known construction (U.S. Pat. No. 5,410,763), where the nose piece of the frame of the optical spectacle insert has two plug-in projections protruding against a nose piece of the sunglasses, which plug-in projections engage in corresponding plug-in recesses of the nose piece of the sunglass frame. To ensure a firm contact of the sunglasses with the head of the wearer, the frame for the integral sun protection disk carries a substantially U-shaped foam pad on the inside, into whose profile protrudes the frame of the optical spectacle insert.

It is therefore the object underlying the invention to provide sunglasses with an optical spectacle insert as described above such that a simple attachment of the spectacle insert can be ensured without a restriction to the respective construction of the spectacle insert or the sunglasses.

This object is solved by the invention in that in its nose piece the optical spectacle insert has a through hole for at least one plug-in projection of an attachment plug engaging in a plug-in recess of the forehead-side portion of the sunglass frame.

By means of the plug-in projection of the attachment plug protruding through the nose piece of the optical spectacle insert in a through hole, the spectacle insert can easily be clamped between the attachment plug and the forehead-side portion of the sunglass frame in the vicinity of the nose piece, when the plug-in insert of the attachment plug engages in the plug-in recess of the sunglass frame. It is therefore merely necessary to provide a corresponding plug-in recess in a forehead-side portion of the sunglass frame, which is possible both in the case of a forehead-side frame web for accommodating an integral sun protection disk and in the case of a sunglass frame with two frame rings for separate sunglasses in the vicinity of the nose piece connecting the frame rings. This does not require any complex constructional elements, so that particularly simple constructional and handling conditions are achieved. This is in particular true when on the inside of the forehead-side portion of the sunglass frame a removable headband is provided, which can be used as attachment plug for the spectacle insert when there is provided a central plug-in projection.

To prevent a rotation of the nose piece of the spectacle insert about the plug-in projection of the attachment plug, the plug-in projection and the through hole in the nose piece of the spectacle insert, which is adapted to the cross-section of the plug-in projection, can have a cross-section differing from the circular shape, which prevents such rotation. A corresponding adaptation of the cross-section will also be performed in the vicinity of the plug-in recess in the forehead-side portion of the sunglass frame, but in general a protection against a rotation of the plug-in projection with respect to the plug-in recess of the sunglass frame is not necessary when a headband serves as attachment plug, which at its end is supported at the sunglass frame to prevent a rotation.

To prevent an unintended withdrawal of the plug-in projection from the plug-in recess of the sunglass frame, the plug-in projection of the attachment plug can engage in the plug-in recess of the sunglass frame in the manner of a snap lock. When the plug-in projection of the attachment plug has a stop for the nose piece of the spectacle insert, this stop can be used to exert a corresponding contact pressure on the nose piece of the spectacle insert. This is chiefly important when for instance the headband used as attachment plug has a corresponding flexibility for a better contact with the forehead of the spectacle wearer.

The attachment of the optical spectacle insert at the sunglass frame by means of a plug-in projection of a headband protruding through the nose piece of the spectacle insert, which plug-in projection engages in a plug-in recess of the forehead-side portion of the sunglass frame, involves the additional advantage that in the case of a missing spectacle insert the ventilation gap between the foreheadside portion of the sunglass frame and the headband becomes adjustable, when the plug-in projection can be pressed into the plug-in recess down to its stop. For this purpose, the plug-in recess of the sunglass frame for the plug-in projection of the headband can have a notch for the plug-in projection engaging in the plug-in recess down to the stop, in addition to a notch for holding the spectacle insert. These two notches define the respective ventilation gap when there is no spectacle insert.

As has already been explained, the headband should rest against the forehead of the spectacle wearer. Due to the different anatomical conditions, a corresponding adaptation of the length of the headband is advantageous. This adaptation of the length can easily be achieved in that the headband centrally fixed with respect to the sunglass frame by means of the plug-in projection is supported at both ends in a slotted guideway of the forehead-side portion of the sunglass frame so as to be slidable in longitudinal direction.

In the drawings, the subject-matter of the invention is represented in an embodiment, wherein:

FIG. 1 shows sunglasses in accordance with the invention with an optical spectacle insert in a simplified rear view, FIG. 2 shows these sunglasses in a top view, FIG. 3 shows a representation of sunglasses in accordance with FIG. 1 without optical spectacle insert, and FIG. 4 shows a section along line IV—IV of FIG. 2 on an enlarged scale.

The sunglasses in accordance with the represented embodiment have a frame 1 with two frame rings 2 for sun protection glasses 3, where the forehead-side frame portion, which is formed by the upper portion of the frame rings 2 and a nose piece 4 connecting these frame rings 2 with each other, is designated with 5. At the side of the frame rings 2 spectacle bows 6 are pivotally mounted. In the gore portion between the nose piece 4 and the two frame rings 2 a usual nose pad 7 is provided. To the forehead-side frame portion 5 a headband 8 with a foam pad 9 is associated, which forms a plug-in projection 10 protruding against the foreheadside portion 5 of the sunglass frame 1, which plug-in projection engages in the manner of a snap lock in a plug-in recess 11, advantageously a through hole, in the vicinity of the nose piece 4. At both ends, the headband 8 is provided with spherical projections 12, which are slidably held in slotted guideways 13 of the forehead-side frame portion 5, so that due to the central fixation of the headband 8 by means of the plug-in projection 10 a terminal compensation of length is achieved for a good contact of the headband 8 with the forehead of a spectacle wearer.

To be able to equip the sunglasses with a spectacle insert 14 whose optical glasses 15 are held in a frame 16, the nose piece 17 thereof is provided with a through hole 18 for the plug-in projection 10 of the headband 8. The spectacle insert 14 can therefore be clamped at the forehead-side frame portion 5 of the sunglass frame 1 by means of the headband 8 when the plug-in projection 10 of the headband 8 engages through the through hole 18 of the nose piece 17 of the spectacle insert 14 into the plug-in recess 11 of the sunglass frame 1. Since the headband 8 has a corresponding flexibility for a better contact with the forehead of a spectacle wearer, the contact pressure required for a clearance-free mounting of the spectacle insert 14 can advantageously be exerted on the nose piece 17 of the spectacle insert 14 via a stop 19 of the plug-in projection 10, as this can be taken in particular from FIG. 4.

To prevent a rotation of the spectacle insert 14 about the plug-in projection 10 of the headband 8, the plug-in projection 10 and the through hole 18 in the nose piece 17 of the spectacle insert 14, which is adapted to the cross-section of the plug-in projection 10, can have a cross-section differing from the circular shape, for instance an oval cross-section.

As can be taken from FIG. 3, which shows the sunglasses without the spectacle insert 14, the plug-in projection 10 can also be plugged into the plug-in recess 11 in the nose piece 4 of the sunglass frame 1 down to the stop 19, which leads to a correspondingly smaller ventilation gap 20 between the headband 8 and the forehead-side frame portion 5 of the sunglasses. By choosing the plug-in depth of the plug-in projection 10, the ventilation gap 20 can thus be adapted to the respective requirements. For this case it is recommended to provide two notches corresponding to the two plug-in depths of the plug-in projection 10 in the plug-in recess 11 of the forehead-side frame portion 1.

It need probably not be particularly mentioned that the invention is not restricted to the illustrated embodiment. The sunglasses can for instance also consist of an integral sun protection disk which is held in a forehead-side frame web, because it is merely important to provide in a forehead-side frame portion of the sunglasses a plug-in recess for a central plug-in projection of a headband. This plug-in projection can also be formed by a separate attachment plug, when no headband should be used. By means of a corresponding stop head of this attachment plug, there can be ensured a clamp mounting of the spectacle insert between the stop head of the attachment plug, which forms a snap fastener so to speak, and the sunglass frame.

What is claimed is:

1. Sunglasses comprising (a) a frame having an upper portion facing the forehead of a wearer,
   (b) an optical spectacle insert comprising
      (1) frames for two lenses and
      (2) a nose piece connecting the frames for the two lenses, and
   (c) a plug-in connection for releasably connecting the optical spectacle insert to the upper frame portion facing the forehead of the wearer, the plug-in connection comprising
      (1) an attachment plug having a plug-in projection engaging in a through hole in the nose piece.

2. The sunglasses of claim 1, wherein the attachment plug is a head band removably mounted on an inside of the upper frame portion facing the forehead of the wearer.

3. The sunglasses of claim 2, wherein the head band is centered by the plug-in connection with respect to the upper frame portion facing the forehead of the wearer, and said upper frame portion has slotted guideways supporting the ends of the head band for sliding in a longitudinal direction.

4. The sunglasses of claim 1, wherein the plug-in projection and the through hole have like non-circular cross-sections.

5. The sunglasses of claim 1, wherein the plug-in projection and the through hole form a snap lock.

6. The sunglasses of claim 1, wherein the plug-in projection forms a stop for the nose piece.

* * * * *